US00H002083H

(19) United States

(12) Statutory Invention Registration (10) Reg. No.: US H2083 H

Bogard et al. (43) Published: Oct. 7, 2003

(54) CELLULOSE ACETATE FILM FOR USE IN LIQUID CRYSTAL DISPLAYS

(75) Inventors: Mark Alan Bogard, Church Hill, TN (US); Darryl Aubrey Godfrey, Gray, TN (US); Tim Joseph Fredrick, Kingsport, TN (US)

(73) Assignee: Eastman Chemical Company, Kingsport, TN (US)

(21) Appl. No.: 09/818,326

(22) Filed: Mar. 27, 2001

(65) Prior Publication Data

US 2002/0142109 A1 Oct. 3, 2002

(51) Int. Cl.[7] ..... C09K 19/00; C08B 3/06

(52) U.S. Cl. ..... 428/1.1; 428/1.54; 536/69; 536/80

(58) Field of Search ..... 428/1.54; 536/69, 536/80

(56) References Cited

U.S. PATENT DOCUMENTS 5,663,310 A * 9/1997 Shimoda et al. ..... 536/69

5,698,135 A * 12/1997 Nishikawa et al. ..... 252/299.4

* cited by examiner

*Primary Examiner*—Michael J. Carone

*Assistant Examiner*—Aileen B. Felton

(74) *Attorney, Agent, or Firm*—Cheryl Tubach; Harry Gwinnell

(57) ABSTRACT

A liquid crystal device having a plurality of pixel electrodes for transmitting light, a first panel having an activation portion for selectively activating the plurality of pixel electrodes, an orientation layer formed on the activation portion, a light shielding pattern formed on the orientation layer, a second panel having a second orientation layer, a liquid crystal formed between the first and second panels, a polarizing plate or a color filter and a protective film on at least one of the aforementioned surfaces wherein the protective layer includes a cellulose ester selected from the group consisting of cellulose acetate, cellulose formate, cellulose propionate, cellulose butyrate, ethyl cellulose, methyl cellulose and benzyl cellulose having an inherent viscosity of from about 1.0 to less than 2.0 dl/g.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CELLULOSE ACETATE FILM FOR USE IN LIQUID CRYSTAL DISPLAYS

BACKGROUND OF THE INVENTION

1. Field of the Invention

The present invention relates to a liquid crystal display and particularly to a polymeric protective layer on the liquid crystal display. More particularly, the present invention relates to a protective layer formed from a cellulose ester having an inherent viscosity.(IV) of about 1.0 dl/g to less than about 2.0 dl/g.

2. Background of the Invention

Cellulose ester films and more particularly, a cellulose acetate film is used in various photographic or optical elements because it is tough and has flame retardant properties. Generally, cellulose acetate film has wide acceptance as a photographic support material. For example, U.S. Pat. Nos. 3,705,148 and 3,718,728 describe methods for improving the resistance to distortion and shrinkage of a cellulose acetate film when exposed to very high temperatures.

Recently, cellulose acetate film has been used in the manufacture of liquid crystal displays or LCDs due to the film having an optical isotropy. The cellulose acetate film is used as a protective film of a polarizing plate or a color filter in the liquid crystal display device. Generally, a liquid crystal display device includes an electrode disposed in each pixel for orienting the position of the liquid crystal molecules of a liquid crystal sealed in the device. The liquid crystal controls transmission of light there through according to the voltage generated by the electrodes in the pixels.

In such a conventional liquid crystal device, an active type thin film transistor is used. This conventional TFT LCD (Thin Film Transistor Liquid Crystal Display) device includes TFTs and pixel electrodes arranged on a TFT panel or bottom plate, a color filter for displaying color and a common electrode which are disposed on a color filter panel or top plate, a liquid crystal (LC) injected between the top and bottom plates, and a pair of polarizers disposed on the outer surfaces of the top and bottom plates for selectively transmitting light.

In the above conventional LCD, the device is designed to transmit light that passes through only the pixel electrodes and color filter and to cut off any other light. To do so, the conventional LCD device uses a light shielding layer (black matrix) formed in the color filter panel (top plate). However, in such cases, it is necessary to provide the black matrix formed on the top plate with extra margins to properly cover the TFT areas on the bottom plate. As a result, a larger black matrix occupying more space is required. This decreases the aperture ratio of the device.

In the production of organic derivatives of cellulose, and especially organic esters of cellulose, such as cellulose acetate, cellulose formate, cellulose propionate and cellulose butyrate, the esterification of cellulose with an organic acid results in a solution of the derivative of cellulose in an acid solvent. For example, in making cellulose acetate, cellulose is acetylated by contacting a cellulosic material, such as wood pulp, cotton linter, and the like with acetic anhydride and a catalyst in the presence of a relatively large amount of acetic acid. The acetic acid dissolves the cellulose acetate that is formed, producing a very heavy and viscous solution, referred to herein as the "acid dope". Usually after hydrolysis, this solution of cellulose acetate is precipitated by adding water until the concentration of the acid reaches a point below which the acid will not hold the cellulose acetate in solution.

The isolation of cellulose acetate, or secondary cellulose materials, from organic solvent solutions, generally referred to as "solvent dope" or "dope", has been extensively investigated. The known process for preparing cellulose acetate, i.e., a cellulose acetate with an approximate average degree of substitution with its acetylation and hydrolysis steps, results in a solution of the acetate in an acetic acid and water mixture. The acetic acid content and the polymerization degree (which has a correlation with the viscosity) of cellulose acetate influence the mechanical strength and the durability of a film obtained from the cellulose acetate. The elasticity, folding endurance, dimensional stability and resistance to moisture and heat decrease with decreasing the acetic acid content and the polymerization degree. An acetic acid content of 58% or more (preferably 59% or more) is necessary to satisfy the required quality of the photographic support or the optical film. The cellulose acetate having an acetic acid content of 58% or more is referred to as triacetyl cellulose. With respect to the polymerization degree, cellulose acetate preferably has a viscosity average degree of polymerization of not less than 270, and more preferably of not less than 290.

A cellulose ester film can be formed using either a melt casting method or a solvent casting method. The melt casting method includes heating the cellulose ester, which may optionally include a plasticizer, to form a melt, casting the melt on a support and cooling the melt to form a film. The film is then removed from the support.

In the solvent casting method, the cellulose ester is dissolved using a solvent to form the dope, casting the dope on a support and drying the dope to form a film. Optionally, the dope may include a plasticizer so that when the film is cast the plasticizer will be incorporated into the resultant film. The solvent cast method is capable of forming a highly flat film as compared to a film made using the melt cast method. Thus, the solvent cast method is generally employed to give a cellulose acetate film.

For various intermediate and end uses, high acetyl content cellulose acetate products are generally dissolved in volatile organic solvents such as dichloromethane and methanol. The solutions can be placed on objects so that when the solvent evaporates, a thin film or coating of cellulose acetate remains on the object. Thus, the solvent used in the solvent cast method must have functions not only of dissolving the cellulose acetate but also of forming an excellent film. In more detail, the viscosity and the polymer concentration of the dope should be appropriately adjusted to form a flat plane film having a uniform thickness. The dope also should have enough stability. Further, the dope should easily be set to gel. Furthermore, the formed film should easily be peeled off the support. The most appropriate solvent must be selected to satisfy these requirements. Moreover, the solvent should be so easily evaporated that the solvent scarcely can remain in the film.

Cellulose acetate films were originally developed for photographic films. For this use, they have certain requirements for mechanical strength and durability. The requirement that photographic film have the strength to survive photographic equipment such as cameras and projectors led to a high strength requirement. The need for sprocket holes in the film and the need for these holes to withstand the mechanical stress required the tensile strength of the film to be high. The intrinsic viscosity for photographic film quality cellulose acetate is about 2.0 dl/g. The intrinsic viscosity and degree of polymerization requirement has a significant effect on the cost and quality of the cellulose acetate film. In the cellulose acetate manufacturing step, higher degrees of polymerization require lower reaction temperatures, longer reaction times and produce less material from equipment. The higher degree of polymerization also requires lower catalyst levels that may lead to lower quality as shown by more insoluble material. In film casting, higher degree of polymerization requires lower solids levels in the casting dope and more filtration equipment and produces less material from a given set of equipment. Liquid crystal display applications use the same commercially available cellulose acetate as photographic film. However, the mechanical strength requirements for cellulose acetate used in a liquid crystal display are less than that for photographic film.

Accordingly, there is a need for a cellulose ester having sufficient strength for use in a LCD that can be made quicker and less expensive relative to a cellulose ester for use in photographic applications.

SUMMARY OF THE INVENTION

The present invention provides an improved LCD having a protective layer comprising a cellulose ester wherein the cellulose ester has a IV of from about 1.0 dl/g to less than about 2.0 dl/g.

It is an object of the present invention to provide an improved LCD protective layer wherein the protective layer includes a cellulose ester, and preferably includes cellulose acetate.

DETAILED DESCRIPTION OF THE INVENTION

Briefly described, the liquid crystal display device has a plurality of pixel electrodes for transmitting light and includes a first panel having an activation portion for selectively activating the plurality of pixel electrodes, an orientation layer formed on the activation portion, and a light shielding pattern formed on the orientation layer; a second panel having a second orientation layer; and a liquid crystal formed between the first and second panels. The LCD further includes polarizing plate or a color filter and a protective film on at least one of the aforementioned surfaces. In accordance with the present invention, the protective film is a cellulose ester of lower fatty acid. Preferred cellulose esters include cellulose acetate, cellulose formate, cellulose propionate, cellulose butyrate, ethyl cellulose, methyl cellulose and benzyl cellulose, with the most preferred cellulose ester being cellulose acetate.

The cellulose acetate used in the present invention has an average acetic acid content in the range of about 58.0 to about 62.5% and having an acetyl degree of substitution greater than about 2.5 to 3.0 and preferably from about 2.6 to 3.0. Cellulose acetate having an acetic acid content of 58% or more is generally known to those skilled in the art as triacetyl cellulose (TAC). As used herein, cellulose acetate and triacetyl cellulose are used interchangeably. As used herein, the acetic acid content means a percent weight ratio of acetic acid moiety combined to the cellulose. The acetic acid content is measured and calculated according to ASTM, D-817-91, the procedure of which is incorporated herein by reference.

Cellulose acetate used in the present invention has an inherent viscosity of from about 1.0 dl/g to about 2.0 dl/g, preferably from about 1.2 dl/g to about 1.8 dl/g and more preferably from about 1.4 dl/g to about 1.8 dl/g. The viscosity average degree of polymerization is calculated from the inherent viscosity of cellulose acetate ($\eta$), according to formula (1):

$$DP=\eta/Km \quad (1)$$

wherein $\eta$ is the inherent viscosity of cellulose acetate and Km is the constant of $6\times10^4$. The viscosity can be measured by an Ostwald viscometer.

Alternatively, the cellulose acetate has an average degree of polymerization (DP) in the range of 50 to 500, preferably from about 50 to 400 and more preferably from about 50 to 300. The intrinsic viscosity and degree of polymerization requirement has a significant effect on the cost and quality of the cellulose acetate film. In the cellulose acetate manufacturing step, higher degrees of polymerization require lower reaction temperatures, longer reaction times and produce less material from equipment. The higher degree of polymerization also requires lower catalyst levels. High catalyst levels can lead to a lower quality product as indicated by the presence of more insoluble material. In film casting, higher degree of polymerization requires lower solids levels in the casting dope and more filtration equipment and produces less material from a given set of equipment.

Other advantages of using a lower IV film include producing the cellulose acetate at a dope at higher temperature, shorter processing times and less acetic anhydride usage. The quality of the lower IV can be superior in terms of particulate count and in terms of the ease of filtration. A lower IV cellulose acetate also offers advantages in film preparation. A higher solids loading can be employed in the film casting operation resulting in higher throughput and lower costs. A lower IV cellulose triacetate can be filtered faster, with less equipment than a high IV material.

Cellulose acetate can have a narrow molecular weight distribution in terms of Mw/Mn (wherein Mw means the weight average molecular weight, and Mn means the number average molecular weight). Mw and Mn can be measured by a gel permeation chromatography. The value of Mw/Mn desirably is in the range of from about 1.0 to 1.7, more preferably from about 1.3 to 1.65, and most preferably from about 1.4 to 1.6. In the case that Mw/Mn is more than 1.7, the viscosity of the dope so increases that the flatness of the film lowers. On the other hand, it is difficult to prepare cellulose acetate having a value of Mw/Mn in the range of 1.0 to 1.4.

In forming the film, cellulose acetate is dissolved in an appropriate solvent, such as a mixture of dichloromethane and methanol, in accordance with know techniques for preparing a solvent dope. For example, in the first stage of the dope formation, cellulose acetate is gradually added to the solvent while stirring at room temperature. Cellulose acetate is swelled with the solvent, but is not dissolved at this stage. The amount of cellulose acetate is in the range of from about 10 to 75 weight %, based on the amount of the mixture, preferably from about 25 to about 55 weight %. and more preferably from about 25 to about 45 weight %. Optionally, other additives, described herein, may be added to the solvent dope.

At the next stage, the mixture is cooled to a temperature of −100° to −10° C., preferably −80° to −10° C., more preferably −50° to −20° C., and most preferably −50.degree. to −30.degree. C. The mixture can be cooled in a dry ice/methanol bath (−75° C.) or in a cooled diethylene glycol solution (−30° to −20° C.). At the cooling stage, the mixture of cellulose acetate and the solvent generally solidify.

Subsequently, the mixture is warmed to a temperature of 0° to 50° C. to dissolve the cellulose acetate in the solvent.

The mixture can be warmed by keeping it at room temperature. The mixture can also be warmed on a bath. Thus, a dope is formed as a uniform solution. If cellulose acetate is not sufficiently dissolved, the cooling and warming steps can be repeated. The dope is observed with eyes to determine whether cellulose acetate is sufficiently dissolved or not.

The dope is cast on a support, and the solvent is evaporated to form a film. Before casting the dope, the concentration of the cellulose acetate in the dope is adjusted that the solids content of the dope is from about of 10 to about 75 weight %. The surface of the support is preferably polished to give a mirror plane. A drum or a band is used as the support. The casting and drying stages of the solvent cast methods are well known to those skilled in the art. For example, to name just a few, such solvent casting methods are described in U.S. Pat. Nos. 2,336,310; 2,367,603; and 2,492,078.

The support preferably has a surface temperature of not higher than about 10° C. when the dope is cast on the support. After casting, the dope can be dried with air for a sufficient amount of time for the film to obtain a sufficient tensile strength to be removed from the support, desirably this is at least 2 seconds. The formed film is peeled off the support, and can be further dried with air to remove any solvent remaining in the film. The temperature of the air can be gradually elevated from 100° to 160° C. The time for casting and peeling can be adjusted as necessary for obtaining the desired film thickness.

The cellulose acetate film can have a thickness in the range of from about 5 to 500 $\mu$m, preferably in the range of about 20 to about 200 Wm, and most preferably in the range of about 50 to about 120 $\mu$m.

A plasticizer can be added to the cellulose acetate film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP) and diethylhexyl phthalate (DEHP). Examples of the citric esters include —O-acetyltriethyl citrate (OACTE) and —O-acetyltributyl citrate (OACTB). Examples of the carboxylic esters include phthalic esters and citric esters. Examples of the other carboxylic esters include butyl oleate, methylacetyl ricinoleate, di-butyl sebacate and various trimellitic esters. Phthalic ester plasticizers (DMP, DEP, DBP, DOP, DEHP) are preferred.

Other plasticizers include 2,2'-methylenebis(4,6-di-t-butylphenyl) sodium phosphate, bis(4-t-butylphenyl) sodium phosphate, bis(p-methylbenzilidene)sorbitol, and bis(p-ethylvindilidene)-sorbitol.

Deterioration inhibitors (e.g., peroxide decomposer, radical inhibitor, metal inactivating agent, oxygen scavenger) or ultraviolet inhibitors can also be incorporated into the cellulose acetate film.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

What is claimed is:

1. In a LCD having a plurality of layers and surfaces and a protective layer covering at least one of the surfaces wherein the improvement comprises forming said protective layer from a cellulose ester of a lower fatty acid having an inherent viscosity of from about 1.0 to less than 2.0 dl/g.

2. The LCD of claim 1 wherein said protective layer is selected from the group consisting of cellulose acetate, cellulose formate, cellulose propionate, cellulose butyrate, ethyl cellulose, methyl cellulose and benzyl cellulose.

3. The LCD of claim 1 wherein said protective layer comprises a cellulose acetate film.

4. The LCD of claim 3, wherein said cellulose acetate has an inherent viscosity of from about 1.2 dl/g to about 1.8 dl/g.

5. The LCD of claim 3 wherein said cellulose acetate has an inherent viscosity of from about 1.4 dl/g to about 1.8 dl/g.

6. The LCD of claim 3 wherein said protective film has a thickness of from about 5 to 500 $\mu$m.

7. The LCD of claim wherein said protective film has a thickness of from about 20 to 200 $\mu$m.

8. The LCD of claim 3 wherein said protective film has a thickness of from about 50 to 120 $\mu$m.

9. The protective layer of claim 3 wherein said cellulose acetate film is formed by solvent casting.

10. In a LCD having a plurality of pixel electrodes for transmitting light, a first panel having an activation portion for selectively activating the plurality of pixel electrodes, an orientation layer formed on the activation portion, a light shielding pattern formed on the orientation layer, a second panel having a second orientation layer, a liquid crystal layer formed between the first and second panels, a polarizing plate or a color filter and a protective layer wherein the improvement comprises forming said protective layer from a cellulose ester having an inherent viscosity of from about 1.0 to less than 2.0 dl/g and wherein said cellulose ester is selected from the group consisting of cellulose acetate, cellulose formate, cellulose propionate, cellulose butyrate, ethyl cellulose, methyl cellulose and benzyl cellulose.

11. The LCD of claim 10 wherein said protective layer comprises a cellulose acetate film having an inherent viscosity of from about 1.2 dl/g to about 1.8 dl/g.

12. The LCD of claim 11 wherein said cellulose acetate has an inherent viscosity of from about 1.4 dl/g to about 1.8 dl/g.

13. The LCD of claim 11 wherein said protective film has a thickness of from about 5 to 500 $\mu$m.

14. The LCD of claim 11 wherein said protective film has a thickness of from about 20 to 200 $\mu$m.

15. The LCD of claim 11 herein said protective film has a thickness of from about 50 to 120 $\mu$m.

16. The protective layer of claim 11 wherein said cellulose acetate film is formed by solvent casting.

* * * * *